United States Patent [19]

Woodbridge

[11] Patent Number: 4,557,359

[45] Date of Patent: Dec. 10, 1985

[54] TRANSMISSION SYSTEMS FOR VEHICLES

[76] Inventor: Samuel A. Woodbridge, 85 Bunya St., Greenslopes, Australia

[21] Appl. No.: 499,156

[22] PCT Filed: Oct. 15, 1982

[86] PCT No.: PCT/AU82/00170

§ 371 Date: May 31, 1983

§ 102(e) Date: May 31, 1983

[87] PCT Pub. No.: WO83/01494

PCT Pub. Date: Apr. 28, 1983

[30] Foreign Application Priority Data

Oct. 15, 1981 [AU] Australia .................... PF1188

[51] Int. Cl.⁴ ............... F16D 41/04; F16D 41/06; F16D 43/04; F16D 43/30

[52] U.S. Cl. ............................. 192/43; 192/50; 192/54; 192/94; 192/114 R; 180/248

[58] Field of Search ............ 192/34, 43, 50, 54, 192/67 A, 94, 114 R; 180/248, 249

[56] References Cited

U.S. PATENT DOCUMENTS

| | | | |
|---|---|---|---|
| 1,210,754 | 1/1917 | Beatty | 180/248 |
| 1,254,180 | 1/1918 | Ward | 192/43 |
| 1,771,072 | 7/1930 | Beggs | 192/50 |
| 1,832,598 | 11/1931 | Weber | 192/50 |
| 1,934,270 | 11/1933 | Maynard . | |
| 1,974,784 | 9/1934 | Pilcher | 192/43 |
| 2,371,564 | 3/1945 | Wemp | 192/54 |
| 2,797,783 | 7/1957 | Lee et al. . | |
| 2,876,878 | 3/1959 | Sinclair et al. . | |
| 3,158,244 | 11/1964 | Lanigan et al. | 192/43 |
| 3,181,673 | 5/1965 | Poliseo . | |
| 3,205,987 | 9/1965 | Clements . | |
| 3,300,002 | 1/1967 | Roper | 180/249 |
| 3,515,250 | 6/1970 | Cantalupo | 192/114 |
| 3,656,598 | 4/1972 | Goble | 192/50 |
| 4,084,673 | 4/1978 | Clements . | |
| 4,261,452 | 4/1981 | Barrows . | |
| 4,274,523 | 6/1981 | Sigg | 192/21 |

FOREIGN PATENT DOCUMENTS

| | | |
|---|---|---|
| 132128 | 3/1948 | Australia . |
| 140300 | 5/1933 | Austria ............ 192/50 |
| 503523 | 4/1939 | United Kingdom . |
| 905378 | 9/1962 | United Kingdom . |

Primary Examiner—Rodney H. Bonck
Assistant Examiner—Alan G. Towner
Attorney, Agent, or Firm—Kimmel, Crowell & Weaver

[57] ABSTRACT

A transmission system for vehicles has a coupling (1) with a tubular body (12) provided with internal helical teeth (19,20) at each end. An input shaft (22) is rotatably journalled in the body (12) and is provided with helical splines (25) along its length. A sliding gear (27) has internal gear teeth (26) engaged with the splines (25) and external gear teeth (28) to selectively engage the teeth (19,20) in the body to couple the input shaft (22) and body (12) together. When the body (12) rotates faster than the input shaft (22), the sliding gear (27) moves along the splines (25) to de-couple the body (12) and input shaft (22) until the rotational speed of the two is again equalized. The coupling (11) may be provided between the transfer case and differential of a four wheel drive (4WD) vehicle, in a free-wheeling hub assembly (30) or in a differential assembly (60) for small vehicles.

6 Claims, 4 Drawing Figures

TRANSMISSION SYSTEMS FOR VEHICLES

BACKGROUND OF THE INVENTION (1) Field of the Invention

This invention relates to improvements in transmission systems for multi-wheel-drive (e.g. 4 WD) vehicles or the like.

(2) Brief Description of the Prior Art

The front and rear differentials of conventional 4 WD vehicles are connected together by the transfer case, when the vehicle is in 4 WD, and so they can only operate at the same speed. When the 4 WD vehicle negotiates a corner, the front wheels may have to roll up to e.g. 15% faster than the rear wheels because they follow a path of greater radius. This leads to strain (called "differential wind-up") between the two differentials and so the front and/or rear tires must slip to enable the vehicle to negotiate the corner. On soft surface e.g. sand, the effects of the tire slip may be minimal. However, on hard surfaces such as tarmac, the tire wear due to such slippage may be very marked.

When the vehicle is in 2 WD, the front differential is disconnected from the rear differential by the transfer case. However, the front wheels, through the front differential, drive the front propellor shaft and this increases the fuel consumption of the vehicle over conventional 2 WD vehicles.

A number of solutions have been proposed in the past to overcome these problems.

The first proposal has been to provide the 4 WD vehicle with a front differential having a higher (numerically lower) gear ratio than the rear differential e.g. 4.10:1 compared with 4.11:1. While this marginally reduces the problem when the vehicle is cornering, the front wheels being slightly driven faster than the rear wheels, the difference is not sufficient to equal the difference (e.g. of 15%) which may be required and the front and/or rear wheels must slip, to compensate for the ratio difference, when the vehicle is travelling straight ahead in 4 WD.

The second proposal, which may be used with the first, has been the use of "free-wheeling hubs" on the front wheels. When the hubs are disengaged, they disconnect the front wheels from the front axles and so the front differential and its propellor shaft are not driven when the vehicle is in 2 WD. However, when the hubs are re-engaged to provide drive for the front wheels, the problem of the requirement from the front and rear wheels re-emerges.

In addition, the hubs are often difficult to engage when the vehicle is bogged and they cannot be engaged and disengaged when the vehicle is moving.

A third proposal has been the provision of a third differential, incorporated in the transfer case, enabling the front and rear differentials to be driven at different speeds. Examples of transfer cases incorporating this third differential include those found in "Jeep" (trade mark) vehicles (under the trade mark "Quadra-Trac") and in "Range Rover" (trade mark) vehicles. To ensure that both differentials are driven, the third differential must be of the limited-slip type and/or have a differential lock. This arrangement is very expensive and cannot be fitted to the transfer cases of existing vehicle.

BRIEF SUMMARY OF THE PRESENT INVENTION

It is an object of the present invention to provide a transmission system which enables an output shaft to rotate faster than, but never slower than, the input shaft, or vice versa.

It is a preferred object of the present invention to provide a transmission system which, when provided between the transfer case and front differential of a 4 WD vehicle, will enable the front differential to rotate faster, but never slower than the rear differential, the front differential being automatically connected to the transfer case when the differentials are rotating at the same speed.

It is a further preferred object to provide a transmission system which enables 4 WD vehicles to operate at highway speeds in 4 WD on any terrain.

It is a still further preferred object to provide a transmission system which can be fitted to the hubs of 4 WD vehicles and which may incorporate a "free-wheeling" capability.

It is a still further preferred object to provide a transmission system which can be used to provide a differential drive to two wheels fitted on a single axle.

Other preferred objects will become apparent from the following description.

In one aspect, the present invention resides in a transmission coupling for a vehicle including:

- a substantially tubular body;
- a plurality of teeth provided circumferentially around the interior of the body at one end, or both ends, of the body;
- a shaft rotatably mounted in the body, coaxially with the plurality of teeth;
- spline means extending along the shaft; and
- a sliding gear rotatably mounted on the shaft, the sliding gear having a plurality of internal gear teeth in engagement with the spline means on the shaft and a plurality of external gear teeth;
- the sliding gear being so arranged to be movable along the shaft between a first position, where the external gear teeth engage the teeth in the body to provide a driving coupling between the shaft and the body, and a second position, where the external gear teeth are disengaged from the teeth in the body to decouple the shaft from the body, the shaft and the body being capable of rotating at different rotational speeds.

Preferably the body and shaft are de-coupled when the body is rotating faster than the shaft.

Preferably the body has a set of teeth at each end, the sets being spaced apart so that in its second position, the sliding gear moves to a position intermediate between, and disengaged from, both sets of teeth. Preferably the sliding gear engages one set of teeth when the shaft is rotating in one direction and the other set of teeth when rotating in the opposite direction.

Preferably the spline means are provided on the shaft in the form of helical screw threads or splines (e.g. of the type found in the Bendix drive of a vehicle starter motor) and they may be of right hand thread cut at an angle of e.g. 0°–60°, most preferably 10°–45°, to the axis of the shaft.

Preferably the teeth in the body and the external gear teeth are complementary and are of opposite hand to the internal gear teeth and splines on the shaft. These teeth may also be cut at an angle of e.g. 0°–60°, more preferably 10°–45°, to the axis of the body.

The shaft may be journalled in suitable bushes or bearings in the end plates of the body and suitable thrust plates or bearings may be provided in the end plates to engage and support the sliding gear.

The transmission coupling may be mounted in the transfer case of a 4 WD vehicle, the shaft being connected to, or formed integrally with, the output shaft of the transfer case for the front axle. Alternatively the coupling may be mounted on the transfer case or front differential and the body may be connected to the front propellor shaft or to the universal joint on the front differential.

Alternatively, a respective transmission coupling may be mounted in each hub of the front wheels of the vehicle, the bodies being connected to the front wheels of the vehicle, and the sliding gear may be lockable in the second position to enable the hubs to "free-wheel".

In a third application a pair of transmission coupling systems may be provided on a drive shaft, the bodies being connected to respective wheels, the couplings providing a differential-type drive for the wheels.

BRIEF DESCRIPTION OF THE DRAWINGS

To enable the invention to be fully understood, a number of preferred embodiments will now be described with reference to the accompanying drawings, in which.

DETAILED DESCRIPTION OF THE PREFERRED EMBODIMENTS

Figure 1:
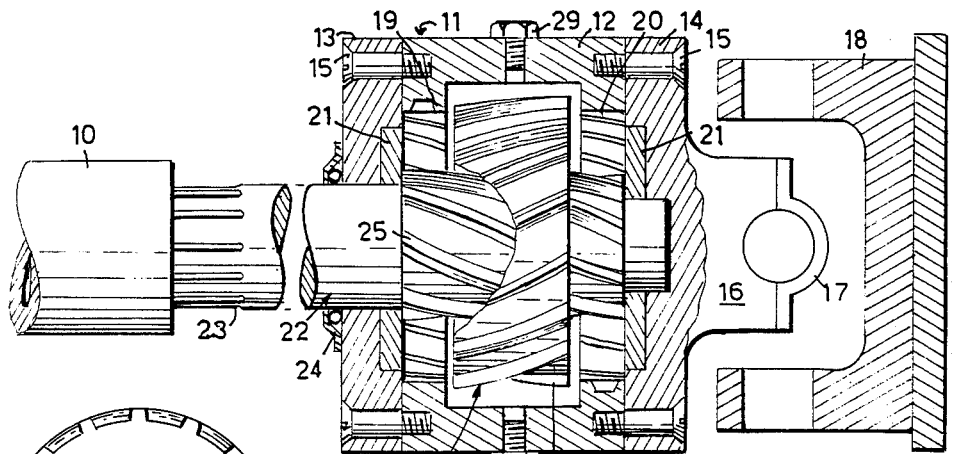
FIG. 1 is a sectional side view of a first embodiment with a coupling provided between the transfer case and front differential of a 4 WD vehicle.
Figure 2:
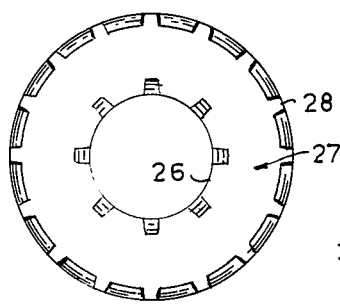
FIG. 2 is a front view of the sliding gear incorporated in the coupling of FIG. 1.

Referring to FIGS. 1 and 2, the front propellor shaft 10 of a 4 WD vehicle is connected, at one end, to the front output shaft of the transfer case (not shown) the other end of the propellor shaft being internally splined.

The coupling 11 has a central, substantially tubular, body 12 closed by removable end plates 13, 14 held in position by studs 15. A yoke 16, with removable caps 17, is provided on the end plate 14 to receive a pair of cross-arms (not shown) of the cross member (also not shown) connecting the coupling to a similar yoke 18 mounted on the input shaft of the front differential (not shown) of the vehicle. Helical teeth 19, 20 are provided circumferentially around the interior of the body 12 at each end, while bearing plates 21 are provided on the inner faces of the end plates 13, 14.

An input shaft 22 is rotatably journalled in bushes (not shown) in the end plates 13, 14 and its free end is provided with parallel splines 23 which slidably, but non-rotatably, engage the internal splines in the propellor shaft 10. A rubber seal assembly 24 seals the shaft 22 to the end plate 13. A series of helical splines 25 are provided around and along the shaft 22 in the interior of the body 12 and these splines engage complementary internal gear teeth 26 (of opposite hand) in a sliding gear 27. Helical external gear teeth 28 are provided around the sliding gear 27, these teeth being adapted to mesh with the helical teeth 19, 20 in the body 12.

Removable plugs 29 enables the lubricant in the coupling 11 to be replenished or replaced.

The operation of the coupling will now be described.

At rest, the sliding gear 27 will occupy the position shown in FIG. 1 and the drive shaft 22 and the body 12 are not coupled.

As the drive shaft 22 begins to turn, power being fed through the transfer case, the rotation of the drive shaft causes the sliding gear 27 to move along the helical splines 25 into engagement with the teeth set 19. As the splines 25 and internal gear teeth 26 in the sliding gear 27 have right hand threads, and the teeth 19 in the body 12 and the external gear teeth 28 on the sliding gear 27 have left hand threads, the sliding gear 27 locks the body 12 to the drive shaft 22 and the front differential is then driven by the front propellor shaft 10 at the same speed as the rear differential.

However, when the vehicle begins to negotiate a corner, the front wheels (and front differential) will rotate faster than the rear wheels. As the coupling 11 is rotated faster than the propellor shaft 10, the hand of the teeth 19 in the body 12 and the external gear teeth 28 on the sliding gear 27 cause the sliding gear 27 to move out of engagement with the body 12 (i.e. the sliding gear 27 will move back along the splines 25 on the drive shaft 22 to the position shown in FIG. 1.

As the corner is being completed, the propellor shaft 10 and coupling 11 will again rotate at the same speed. The sliding gear 27 will again move along the splines 25 to be re-engaged with the teeth 19 to recouple the propellor shaft 10 to the front differential, driving the front wheels.

When the vehicle is reversed, the opposite rotation of the drive shaft 22 will move the sliding gear 27 into engagement with the teeth set 20 to couple the front differential and the propellor shaft 10 together. The operation of the coupling will then be as hereinbefore described.

By selection of suitable angles for the splines 25 and the teeth 19, 20, 26 and 28, smooth engagement and disengagement between the drive shaft and body will be obtained. However, if clamping is required, the sliding gear 27 may be assembled from an inner ring having the internal gear teeth 26 and an external ring having the external gear teeth 28, the rings being interconnected by a suitable clamping medium e.g. an elastomeric annular ring or springs.

Figure 3:
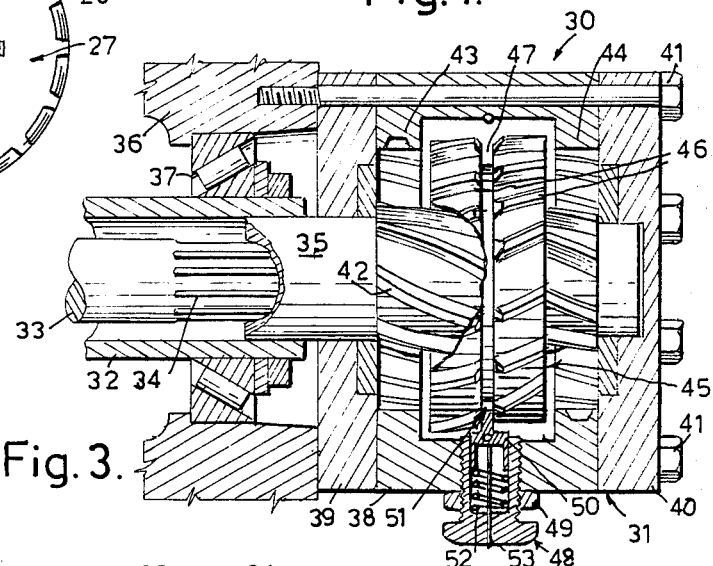
FIG. 3 is a sectional side view of a second embodiment with a coupling providing a "free-wheeling" hub for a vehicle.

FIG. 3 shows a "free-wheeling" hub 30 for a 4 WD which incorporates a coupling 31 similar to the coupling 11 of FIG. 1.

The vehicle has tubular front stub axles 32 fitted with axle shafts 33 driven by the front differential (not shown) via constant velocity joints (also not shown). Each axle shaft 33 is provided with external splines 34 which engage complementary internal splines in the drive shaft 35 of the coupling 31.

A hub member 36 is rotatably mounted on the front stub axle 32 via suitable roller bearings 37. The coupling 31 has a body 38 and end plates 39, 40 secured to the hub member 36 by studs 41. The drive shaft 35 has splines 42, and the body 38 has teeth sets 43, 44 in the same manner as hereinbefore described with reference to FIG. 1.

The sliding gear 45 has internal gear teeth (not shown) which engage the splines 42 and external gear teeth 46 separated into two sections by a central peripheral groove 47.

When the hub 30 is in its normal operation mode for 4 WD, the coupling 31 will operate in the same manner as hereinbefore described. However, to maintain the hub in a "free wheeling" mode in 2 WD, it is necessary to "lock" the sliding gear 45 in the central, uncoupled position as shown in FIG. 3.

The free wheel lock 48 is threadably engaged in the body 38 and is locked by a locknut 49. The lock 48 has a central bore which slidably receives a locking block 50 which has a nose 51 releasably engageable in the groove 47, the nose being urged into engagement with the groove by a spring 52.

To release the lock 48, the lock nut 49 is released and the lock 48 screwed outwardly until the nose 51 clears the external gear teeth 46 on the sliding gear, the locking block 50 being pulled outwardly by a rod fixed to the lock 48 and having a head (not shown) in a bore (not shown) in the nose 51. The locknut 49 is retightened.

To apply the lock, the locknut 49 is released, the lock 48 is screwed inwardly and locknut 49 retightened. The nose 51 bears on the external gear teeth 46 and so the locking block 50 is urged into the lock 48 against the spring 52. The vehicle is moved backwardly and/or forwardly until the groove 47 becomes aligned with the nose 51. The nose enters the groove, preventing further movement of the sliding gear and so the hub 30 is now free-wheeling.

Figure 4:
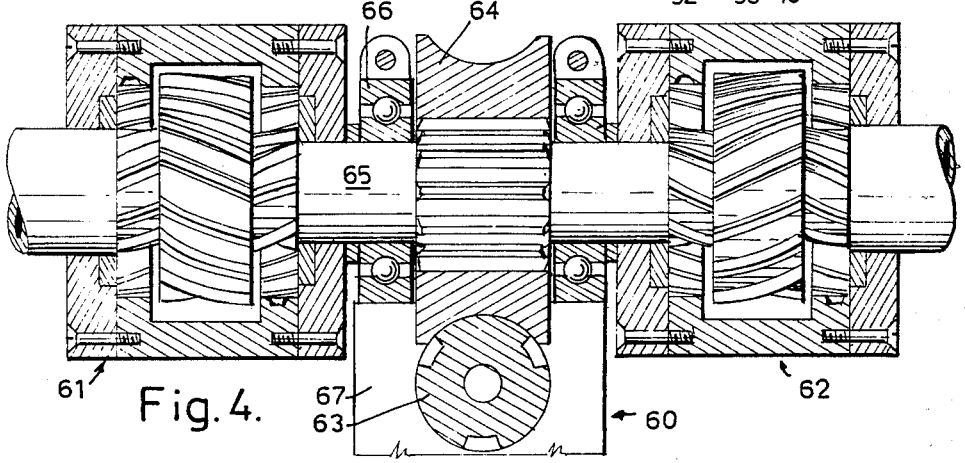
FIG. 4 is a sectional rear view of a third embodiment with a pair of couplings providing a differential assembly for a vehicle.

FIG. 4 shows a differential assembly 60 incorporating two couplings 61, 62. An input worm drive 63 is connected to a motor (not shown) by a suitable transmission means (also not shown). The worm drive 63 engages a complementary drive gear 64 fitted to a drive axle 65 journalled in bearings 66 in the differential housing 67.

Each coupling 61, 62 is connected to a respective drive wheel (not shown) journalled on the axle 65. Each coupling 61, 62 is arranged as in the manner described with respect to FIG. 1, except that the splines, teeth sets and gear teeth of the coupling are of opposite hand. This ensures that both coupling will be engaged when the vehicle is moving in a straight line. However, when the vehicle negotiates a corner, the coupling connected to the outer wheel will become disengaged as the corner is negotiated. For example, if the vehicle is turning left, coupling 61 will remain engaged but coupling 62 will become disengaged. During the corner, drive will be applied to the inner drive wheel.

In a modified form of the couplings, the drive shafts may be provided with plain splines extending along the drive shafts. The sliding gears are then movable along the drive shafts by operating rods or yokes which may be controlled electrically and/or hydraulically to disengage the couplings when the input and output speeds are not equal.

It will be readily apparent to the skilled addressee that the transmission coupling may be used in a wide range of alternative applications, and that various changes and modifications may be made to the embodiments described, without departing from the scope of the present invention. For example, in a multiple-wheel-drive vehicle having three or more drive axles, adjacent pairs of axles may be driven by drive shafts fitted to the couplings to prevent differential "wind-up" between the adjacent axles.

I claim:

1. A transmission coupling for a vehicle including:
   a substantially tubular body;
   a respective set of helical gear teeth provided circumferentially around the interior of the body at each end of the body;
   a shaft rotatably mounted in the body, coaxially with the plurality of teeth;
   helical spline means extending along the shaft;
   a sliding gear rotatably mounted on the shaft, the sliding gear having a plurality of internal helical gear teeth in engagement with the helical spline means on the shaft and a plurality of external helical gear teeth;
   the sliding gear being so arranged to be movable along the shaft between a first position, where the external gear teeth engage a first set of teeth in the body to provide a driving coupling between the shaft and the body in one direction, a second position where the external gear teeth are dis-engaged from both sets of teeth in the body to decouple the shaft from the body, the shaft and the body being capable of rotating at different rotational speeds, and a third position where the external gear teeth engage the other set of teeth in the body to provide a driving coupling between the shaft and the body in the opposite direction;
   wherein:
   the sliding gear is moved from the first position to the second position when the rotational speed of the body is greater than the rotational speed of the shaft, the body forming the output side of the coupling;
   the sliding gear is moved from the second position to the third position, engaging the other set of teeth, when the shaft is rotated in the opposite direction, and
   the spline means on the shaft and the internal gear teeth on the sliding gear are of one hand, and the teeth in the body and the external gear teeth on the sliding gear are of opposite hand, the sliding gear locking the shaft to the body when the external gear teeth on the sliding gear engage the sets of teeth in the body.

2. A coupling as claimed in claim 1 wherein:
   a respective end plate is provided at each end of the body; and
   the shaft is journalled in bearings or bushes in the end plates, thrust means being provided in the end plates to engage and support the sliding gear when the external gear teeth are in engagement with the teeth in the body.

3. A transmission assembly for a four-wheel-drive (4 WD) vehicle including:
   a front differential and a rear differential;
   a transfer case to provide drive to the differentials;
   a front propellor shaft connected at one end to the transfer; and
   a coupling as claimed in claim 1 wherein:
   the shaft is connected to the other end of the propellor shaft; and
   the body is connected to the front differential;
   so arranged that the coupling unit is decoupled when the vehicle negotiates a corner, the front differential rotating at a higher rotational speed than the propellor shaft.

4. A free-wheeling hub assembly for a four-wheel-drive vehicle including:
   an axle;
   an axle shaft rotatably mounted in the axle;
   a hub means rotatably mounted on the axle; and a coupling as claimed in claim 1 wherein:
the shaft is connected to the axle shaft and the body is connected to the hub means.

5. A hub-assembly as claimed in claim 4 and further including:
means to releasably lock the sliding gear in the second position to decouple the hub means from the axle shaft.

6. A differential assembly for a vehicle including:
an axle means;
a driven gear on the axle means;
drive means to drive the driven gear;
a wheel rotatably mounted on the axle means on each side of the driven gear; and
a respective coupling as claimed in claim 1 connecting each wheel to the axle means to operatively drive the wheels, wherein:
one of the couplings is decoupled when the vehicle negotiates a corner, the other coupling driving its respective wheel.

* * * * *